(12) United States Patent
Rybarczyk et al.

(10) Patent No.: US 12,130,244 B2
(45) Date of Patent: Oct. 29, 2024

(54) METHOD FOR EVALUATING THE OPTICAL QUALITY OF A DELINEATED REGION OF A GLAZING

(71) Applicant: SAINT-GOBAIN GLASS FRANCE, Courbevoie (FR)

(72) Inventors: Théo Rybarczyk, Pimprez (FR); Laurent Remeur, Margny les Compiegne (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 254 days.

(21) Appl. No.: 17/764,393

(22) PCT Filed: Sep. 25, 2020

(86) PCT No.: PCT/EP2020/077015
§ 371 (c)(1),
(2) Date: Mar. 28, 2022

(87) PCT Pub. No.: WO2021/063847
PCT Pub. Date: Apr. 8, 2021

(65) Prior Publication Data
US 2022/0334068 A1    Oct. 20, 2022

(30) Foreign Application Priority Data

Sep. 30, 2019   (FR) .................................... 1910824

(51) Int. Cl.
*G01N 21/958*    (2006.01)
*G01N 21/88*    (2006.01)

(52) U.S. Cl.
CPC ....... *G01N 21/958* (2013.01); *G01N 21/8806* (2013.01); *G01N 21/8851* (2013.01);
(Continued)

(58) Field of Classification Search
CPC ............ G01N 21/958; G01N 21/8806; G01N 21/8851; G01N 2021/8832;
(Continued)

(56) References Cited

U.S. PATENT DOCUMENTS 6,208,412 B1    3/2001 Ladewski
6,509,967 B1    1/2003 Pingel et al.
(Continued)

FOREIGN PATENT DOCUMENTS

EP    0 484 237 A1    5/1992
EP    0 342 127 B1    11/1994
(Continued)

OTHER PUBLICATIONS

International Search Report as issued in International Patent Application No. PCT/EP2020/077015, dated Dec. 3, 2020.
(Continued)

*Primary Examiner* — Christina A Riddle
(74) *Attorney, Agent, or Firm* — Pillsbury Winthrop Shaw Pittman LLP (57) ABSTRACT

A method for measuring the optical quality of a delineated region of a glazing, the delineated region being intended to be placed in front of an acquiring or measuring device such as a camera. The method is particularly suitable for measuring the optical quality of a delineated region of a transportation-vehicle glazing, such as an airplane or automobile windshield, in front of which an optical device for recording images or a device for measuring the environment outside the vehicle is placed with a view to enabling operation of an advanced driver-assistance system of the vehicle.

14 Claims, 4 Drawing Sheets

(52) U.S. Cl.
CPC ............... *G01N 2021/8832* (2013.01); *G01N 2021/9586* (2013.01)

(58) Field of Classification Search
CPC ... G01N 2021/9586; G01N 2021/8829; G01N 2021/8841; G01N 2021/9583; G01N 2021/8809; G01N 2021/8835; G01N 2021/8854–8896; G01N 21/896; G01N 21/88; G01N 21/95; G01N 2021/216; G01N 2021/845; G01N 21/23; G01N 21/274; G01N 21/455; G01N 21/8903; G01N 2201/0635; G01N 2201/102; G01J 9/02; G01J 2009/0238; G01J 9/00; G01M 11/0228; G01M 11/0264; G01M 11/0271; G01M 11/0278; G01M 11/02; G01M 11/0292; G06T 7/0002; G06T 2207/30108; G06T 7/001; G06T 2207/10016; G06T 2207/20056; G06T 2207/30168; G06T 2207/30252; G06T 7/0004; G06T 7/269; G06T 7/514; G06T 7/521; G01B 11/2513; B60J 1/02; B60J 1/001; B60J 3/02; B60J 3/0208; B60R 11/04; B60R 2011/0026; B60R 1/00
USPC ............................................ 356/237.1–237.6
See application file for complete search history.

(56) References Cited

U.S. PATENT DOCUMENTS

| | | |
|---|---|---|
| 2011/0187855 A1 | 8/2011 | Pichon et al. |
| 2012/0098959 A1 | 4/2012 | Addington |
| 2018/0164225 A1* | 6/2018 | Zheng ................ G01N 21/8914 |
| 2018/0224380 A1 | 8/2018 | Vild et al. |
| 2022/0349837 A1* | 11/2022 | Bard ................. G01N 21/8851 |

FOREIGN PATENT DOCUMENTS

| | | |
|---|---|---|
| EP | 0 463 940 B1 | 2/1995 |
| EP | 1 061 357 A2 | 12/2000 |
| EP | 2 167 948 A1 | 3/2010 |
| EP | 2 236 979 A2 | 10/2010 |
| EP | 2 386 848 A1 | 11/2011 |
| EP | 3 012 619 A1 | 4/2016 |
| GB | 2 152 210 A | 7/1985 |
| WO | WO 98/17993 A2 | 4/1998 |
| WO | WO 2009/007130 A1 | 1/2009 |
| WO | WO 2016/209413 A1 | 12/2016 |
| WO | WO 2019/158855 A1 | 8/2019 |

OTHER PUBLICATIONS

Hariharan, P., et al., "Digital phase-shifting interferometry: a simple error-compensating phase calculation algorithm," Applied Optics, vol. 26, No. 13, Jul. 1987, pp. 2504-2506.

* cited by examiner

METHOD FOR EVALUATING THE OPTICAL QUALITY OF A DELINEATED REGION OF A GLAZING

CROSS-REFERENCE TO RELATED APPLICATIONS

This application is the U.S. National Stage of PCT/EP2020/077015, filed Sep. 25, 2020, which in turn claims priority to French patent application number 1910824 filed Sep. 30, 2019. The content of these applications are incorporated herein by reference in their entireties.

The invention relates to a method for measuring the optical quality of a delineated region of a glazing, said delineated region being intended to be placed in front of an acquiring or measuring device such as a camera. The invention is particularly suitable for measuring the optical quality of a delineated region of a transportation-vehicle glazing, such as an airplane or automobile windshield, in front of which an optical device for recording images or a device for measuring the environment outside the vehicle is placed with a view to enabling operation of an advanced driver-assistance system of said vehicle.

Transportation vehicles, and in particular motor vehicles, are increasingly being fitted with advanced driver-assistance systems (ADAS). Among other functionalities, these on-board systems may provide real-time information on the state of road traffic and/or on the state of equipment and mechanical and/or electrical components of the vehicle, assess the state of fatigue or distraction of the driver, detect and anticipate possible threats from the environment outside the vehicle, or even help the driver to perform certain difficult maneuvers such as overtaking other vehicles or parking.

To enable them to function, these systems incorporate many devices or sensors that allow data to be collected on the driver, the vehicle and/or their environment. Certain systems, such as, for example, parking assistance systems, autonomous driving systems or even collision avoidance systems, use one or more optical image-acquiring devices or devices for measuring the environment outside the vehicle. These devices are generally placed in the cab of the vehicle, behind one of the glazings of said vehicle, said glazing then generally performing a protective function with respect to this device. They may also be incorporated directly into the glazing, for example between two glass sheets of a laminated glazing, one of which is provided with a cavity for accommodating a device.

The glazing may be any of the usual glazings of the vehicle: windshield, rear window, side windows. Most often the optical devices are arranged behind the windshield in order to acquire information from in front of the vehicle.

The information or data acquired by the devices, such as for example images in the case of optical recording devices, are processed by on-board systems in order to obtain the desired functionality. For example, a system for assisting with night driving allows a video of the outside environment to be displayed in real time on the dashboard of the vehicle via an infrared camera placed behind the windshield of the vehicle. An autonomous driving system processes the images acquired by a camera placed behind the windshield of the vehicle in order to extract therefrom the data required by the unit for driving the vehicle automatically.

In order for advanced on-board systems that employ optical recording devices or measuring devices arranged behind glazings to be able to operate optimally, it is necessary for the data acquired by said optical devices to be reliable, i.e. free of any artefact. Thus, said glazings must have a sufficient optical quality, in order to avoid optical defects and/or aberrations such as spherical aberration, chromatic aberration, astigmatism and/or coma.

These devices, in particular when located behind a windshield, are generally placed behind inclined glazings and, in the majority of cases, in a region of the glazings delineated by decorative elements allowing the elements of said devices, with the exception of the active elements thereof for acquiring images or measuring any other parameter, to be hidden from view from outside the vehicle.

However, these decorative elements, which are generally enamels deposited on the surface of the glazing, may limit device field of acquisition. In particular, with the miniaturization of devices, the size of the delineated region may become very small in order to ensure that non-active elements of said devices cannot be seen from outside the vehicle. In such a configuration, the decorative elements may be very close to the acquisition field, and the aberrations and/or optical defects caused thereby may have a very critical effect on the correct operation of the devices.

Furthermore, for esthetic reasons regarding the whole of the glazing, it may be desirable to decrease the size of decorated regions whereas, for technical reasons, it may be desirable to increase the size of the region delineated by said decorated regions and intended to be placed in front of an acquiring or measuring device. The size of the decorative elements allowing the non-active elements of the devices to be hidden from view from outside the vehicle then becomes very small. The decorative elements are then placed very close to the acquisition field of the devices, and, as above, the aberrations and/or optical defects that they cause may have a very critical effect on the correct operation of said devices.

These optical distortions may have various origins. For example, in the particular case of regions delineated by decorative mineral enamels deposited at high temperature on glazings made of glass, differences in the coefficients of thermal expansion of or physico-chemical interactions between the materials of the enamel and the glass may cause local variations in properties near their edges. These variations may for example be variations in refractive index and/or geometric deformations with respect to the rest of the area of the glass away from the edges of the enameled regions.

The area of the delineated regions may also contain functional elements that are located directly in the acquisition or measurement field of the acquiring or measuring devices. These elements may, for example, be networks of heating wires with various geometries, or even functional layers with optical or thermal properties. These functional elements also cause optical distortions. An example of functional elements is illustrated in FIG. 2d.

Glazings comprising a delineated region intended to be placed in front of an acquiring or measuring device are manufactured before the integration of said device. It is therefore necessary to check the optical quality of the delineated region in order to prevent the presence of optical distortions, in particular near the edges of the delineated region, from causing detrimental artefacts to appear in the images or signals acquired by these devices.

The prior art describes many methods for inspecting or measuring the optical quality of glazings, in particular vehicle windshields.

For example, patents EP 0463940 B1 and EP 0342127 B1 describe methods for inspecting a glazing in which the levels of optical deformation of the glazing are determined on the basis of a shadowgraph image.

Patent applications WO9817993 and GB2152210 and patent EP 1061357 disclose methods for detecting optical anomalies in a transparent sheet via analysis of the image of a geometric pattern reflected or transmitted by the sheet.

However, these methods are unsuitable in that they do not allow the quality of a delineated region of a glazing to be measured, and in particular the optical quality of said region to be accurately measured when the elements, such as enamels, delineating said region are the source of optical distortions in proximity thereto. Specifically, these methods have a spatial resolution such that the measurements of optical quality are limited to a segment of the area of said delineated region. The edges of this segment must be sufficiently far from the edges of the decorative elements of the delineated region if measurement artefacts are to be avoided.

Thus, the choice of the size of this segment, and thus the distance of its edges from the edges of the decorative elements, is often arbitrary in the sense that, as a precautionary measure, this size is often chosen to be smaller than necessary. In practice, such a segment is obtained using a digital mask used to mask, in the images, said segment that is close to the edges of the decorative elements.

As a result of this drawback the delineated regions are larger than necessary in order to compensate for the limits of current measurement methods, this possibly having an adverse effect on the final appearance of the glazing as elements of the devices may then be seen from the outside of the vehicle. There is therefore a need for a method allowing the optical quality of a larger segment of these delineated regions, i.e. one that gets as close as possible to the interior edges of these delineated regions, to be measured. This would have the advantage of avoiding delineated regions that are larger than the optical device requires to operate optimally.

Another known method for inspecting the optical quality of an area is phase-measuring deflectometry. Phase-measuring deflectometry consists in measuring the geometric distortion of the image of a test pattern, such as a grid, reflected or transmitted by the reflective or transparent area of an object. Measurement of this deformation amounts to identifying the local phase shift of the test pattern with respect to the situation in the absence of a sample or product to be evaluated. This measurement may provide information on the local curvatures of this area and on the deflection of light rays when passing through the area in question.

There are two types of phase-measuring deflectometry.

Temporal phase-measuring deflectometry employs a test pattern made up of a periodic pattern the phase of which varies over time. For example, for a test pattern consisting of a set of fringes, a preset phase shift is introduced between the fringes by moving the fringes as a function of time. To produce this type of test pattern, a digital screen on which sets of out-of-phase fringes are successively and dynamically displayed by an inspecting unit is generally used. Temporal phase-measuring deflectometry is known to be not very suitable for measuring the curvature of an area smaller than 0.5 $m^2$, which is typically the area of a delineated glazing region intended to be placed on the optical axis of an optical device with a view to enabling operation of an advanced driver-assistance system.

Spatial phase-measuring deflectometry uses a fixed test pattern. It is variations in the curvature of the area reflecting or transmitting an image of the test pattern that introduce the phase shift. The accuracy of the measurement of the phase shift then depends on the spatial resolution of the optical device used to acquire the image of the test pattern. For example, in the case of an optical digital device, the resolution will depend on the size of the contiguous pixels of said device.

Furthermore, the image of the test pattern must not be too greatly deformed by the area of the object, as otherwise the local shift in the phase of the test pattern cannot be accurately measured. However, in proximity to the edges of a delineated glazing region intended to be placed on the optical axis of an optical device with a view to enabling operation of an advanced driver-assistance system, the optical distortions may be such that the deformation of the image of the test pattern prevents the local shifts in the phase of the test pattern from being measured.

Examples of methods and devices based on phase-measuring deflectometry are described in applications EP 2167948 A1, EP 2236979 A1, and EP 2386848 A1.

Certain methods described in the prior art allow certain limitations of phase-measuring deflectometry to be overcome, but none are suitable for measuring the quality of a delineated region of a glazing, and in particular for accurately measuring the optical quality of said region when the elements, such as enamels, delineating said region may be the source of optical aberrations and/or defects in proximity thereto.

The present invention solves this problem. It relates to two alternative methods as defined in claims 1 and 2, the independent claims being advantageous embodiments.

Surprisingly, considering that this type of method is considered unsuitable in the prior art, the invention allows the optical quality of small areas, in particular areas smaller than 0.5 $m^2$, to be measured using a temporal phase-measuring deflectometry method. The idea behind the invention is that of acquiring, in transmission, the images of a plurality of periodic patterns with multiple different phases with the focal point of the optical digital acquiring device modified, in particular so that it is the edges of the delineated region that are in focus, so that they appear optically sharp. In this configuration, the digital acquiring device is not focused on the periodic patterns transmitted through the delineated region.

The invention advantageously allows the amount of the measured segment of the delineated region that is right next to the edges of said region to be increased without the optical distortions liable to be caused by said edges degrading the measurement. Furthermore, the invention allows a measurement to be obtained for each pixel of the optical digital acquiring device, which prior-art methods do not allow.

In order to facilitate comprehension of the present invention, it will now be described and illustrated with reference to the elements in the various views shown by the drawings.

Figure 1:
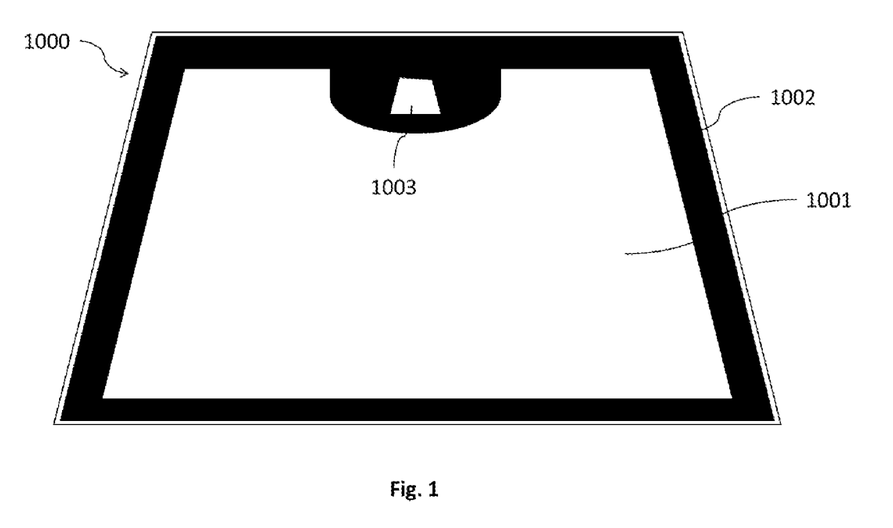
FIG. 1 is a schematic representation of a glazing comprising a delineated region that is intended to be placed on the optical path of an optical device such as a camera.

FIG. 1 schematically shows a motor-vehicle glazing 1000, such as a windshield. The glazing 1000 comprises a glass sheet 1001 and an enamel strip 1002. The enamel strip 1002 forms a delineated region 1003 intended to be placed on the optical path of an optical device, such as a camera of an advanced driver-assistance system. The area of the delineated region is generally smaller than 0.5 m².

The enamel strip 1002 may be entirely placed on the surface of a single of the two main faces of the glass sheet 1001, or be divided into a plurality of portions, each of the portions being placed on one or other of the faces of the glass sheet 1001 and all of the portions together forming a delineated region 1003. In the case of multiple glazing comprising a plurality of glass sheets, such as laminated glazing, the enamel strip may also be divided into a plurality of portions, each portion being arranged on the surface of two or more glass sheets depending on the number of portions so as to form a delineated region 1003.

Figure 3:
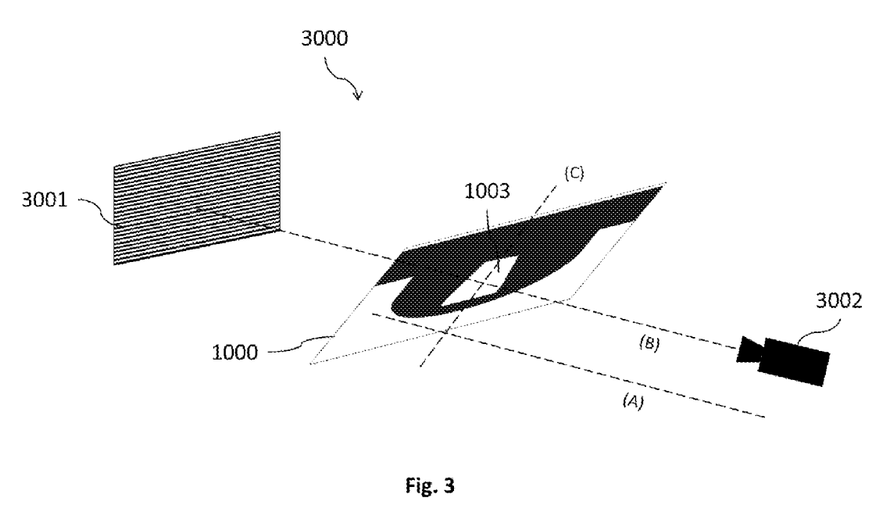
FIG. 3 is a schematic representation of a system for implementing a method according to a first aspect of the invention with a sinusoidal pattern in a first direction.
Figure 4:
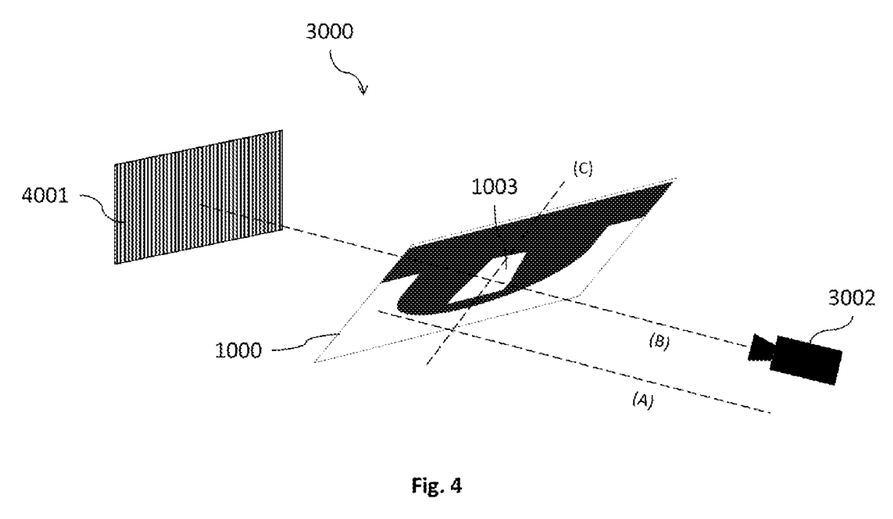
FIG. 4 is a schematic representation of the system shown in FIG. 3 with a sinusoidal pattern in a second direction.

FIGS. 3 and 4 illustrate an example of a system allowing the method according to the invention to be implemented. The system 3003 comprises an optical digital acquiring device 3002 and a plurality of periodic patterns 3001, 4001 of multiple different phases arranged in a first and a second direction. The patterns 3001, 4001 are placed on the optical axis (B) of the optical digital device 3002. The delineated region 1003 of a glazing 1000 is placed on the optical path (B) using a suitable holder (not shown).

The method according to a first aspect of the invention is illustrated in FIGS. 3 and 4. It is a question of a method for measuring the optical quality of a delineated region 1003 of a glazing 1000, said method comprising the following steps:

(1) acquiring 3000, through said delineated region 1003 of the glazing 1000, images of a plurality of periodic patterns 3001 of multiple different phases using an optical digital acquiring device 3002, the surface of said delineated region 1003 being in the depth of field of said optical digital acquiring device 3002, and said patterns 3001 being oriented in a first direction in space;

(2) acquiring 4000, through said delineated region 1003, images of a plurality of periodic patterns 4001 of multiple different phases, using said optical digital acquiring device 3001, the surface of said delineated region 1003 being in the depth of field of said optical digital acquiring device 3002, and said patterns being oriented in a second direction in space;

(3) measuring, for each of the points corresponding to the pixels of the optical digital acquiring device 3002, phase shifts between the images of the periodic patterns 3001, 4001 acquired in steps (1) and (2) and the corresponding images of the periodic patterns 3001, 4001 acquired in the absence of the glazing;

(4) computing, for each of the points corresponding to the pixels of the optical digital acquiring device 3002, values of at least one optical quality criterion on the basis of all of the measurements of the phase shifts obtained in step (3).

Figure 5:
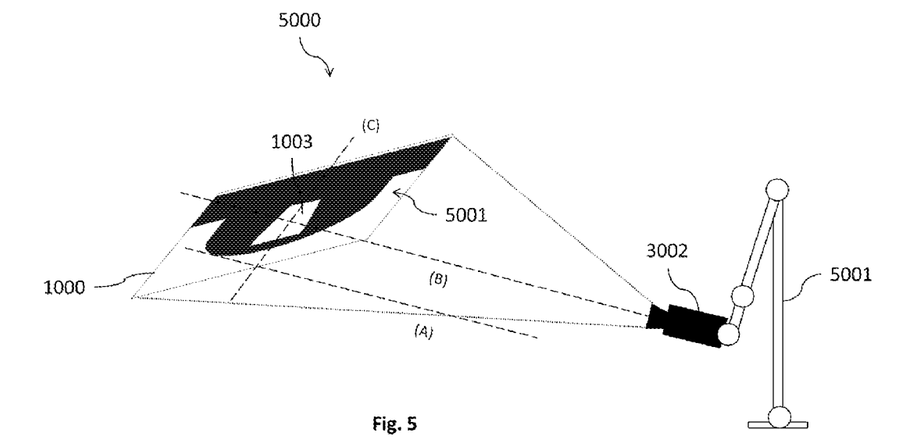
FIG. 5 is a schematic representation of a system for implementing a method according to a second aspect of the invention with the optical digital acquiring device in a first position.
Figure 6:
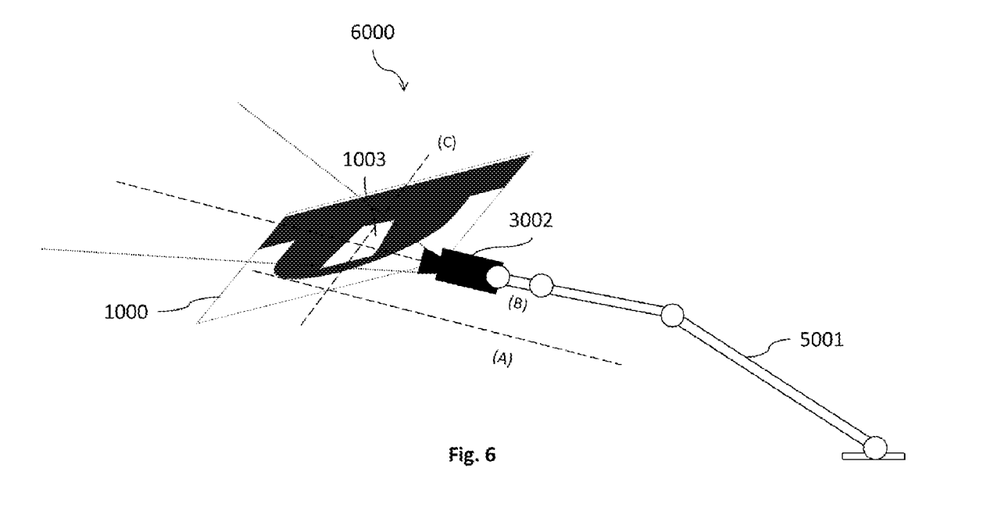
FIG. 6 is a schematic representation of the system shown in FIG. 5 with the optical digital acquiring device in a second position.
Figure 7:
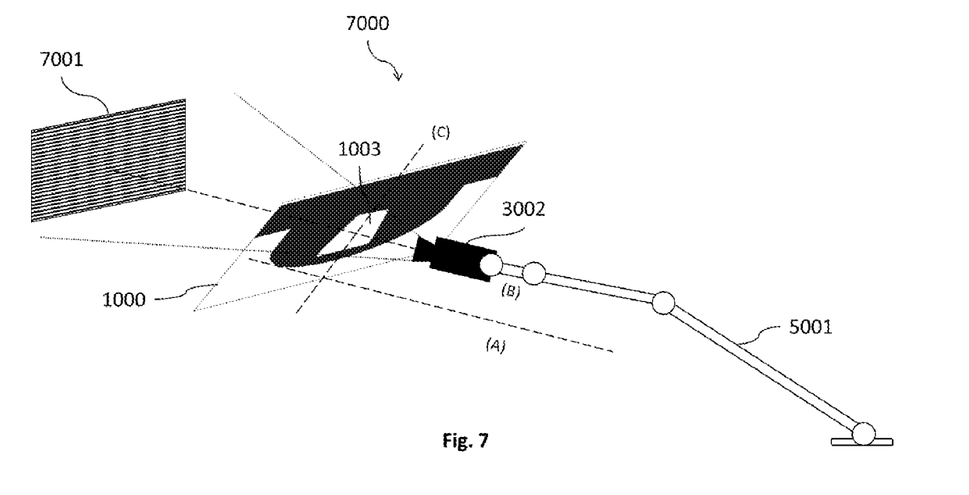
FIG. 7 is a schematic representation of the system shown in FIG. 6 with a sinusoidal pattern in a first direction.
Figure 8:
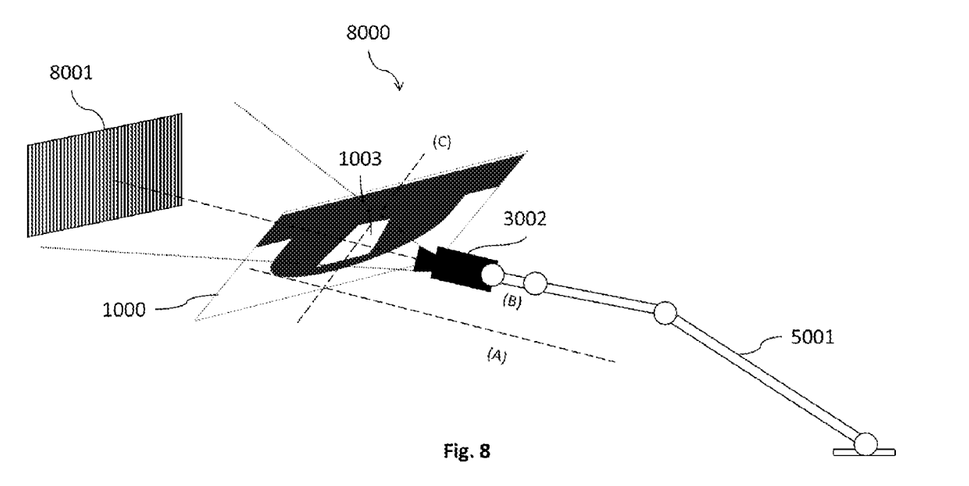
FIG. 8 is the schematic representation shown in FIG. 6 with a sinusoidal pattern in a first direction with a sinusoidal pattern in a second direction.

The method according to a second aspect of the invention is illustrated in FIGS. 5 to 8. It is a question of a method for measuring the optical quality of a delineated region 1003 of a glazing 1000, said method comprising the following steps:

(1) positioning 5000 an optical digital acquiring device 3002 such that the surface of the glazing assembly 1000 is in the depth of field of said optical digital acquiring device 3002;

(2) acquiring, using said optical digital acquiring device 3002, at least one image of the surface of said glazing;

(3) locating the delineated region of the glazing on the surface of the glazing using digital processing of the image acquired in step (2);

(4) positioning 6000 the optical digital device 3002 facing the delineated region 1003 of the glazing 1000 in a position corresponding to that of an acquiring or measuring device of an advanced on-board system placed facing said delineated region 1003;

(5) acquiring 7000, through said delineated region 1003 of the glazing 1000, images of a plurality of periodic patterns 7001 of multiple different phases using an optical digital acquiring device 3002, said patterns 7001 being oriented in a first direction in space;

(6) acquiring 8000, through said delineated region 1003, images of a plurality of periodic patterns 8001 of multiple different phases, using said optical digital acquiring device 3001, said patterns being oriented in a second direction in space;

(7) measuring, for each of the points corresponding to the pixels of the optical digital acquiring device 3002, phase shifts between the images of the periodic patterns 7001, 8001 acquired in steps (1) and (2) and the corresponding images of the periodic patterns 7001, 8001 acquired in the absence of the glazing;

(8) computing, for each of the points corresponding to the pixels of the optical digital acquiring device 3002, values of at least one optical quality criterion on the basis of all of the measurements of the phase shifts obtained in step (7).

A first advantage of the two aspects of the invention is that they allow the optical quality at less than 0.1 mm from the interior edges of the delineated region to be accurately measured, with a precision of a few tenths of a diopter when the optical quality criterion is an optical power.

A direct result is the potential decrease in the number of glazings scrapped. Specifically, by virtue of the invention, certain glazings comprising delineated regions that prior-art quality-control methods would have rejected if the edges of the delineated region were not masked for the quality measurement are not. In other words, glazings comprising delineated regions that prior-art quality-control methods reject even though they are normally acceptable may be identified by the method of the invention.

Another advantage of the two aspects of the invention is that they allow a quality criterion to be mapped over the whole of the delineated region. Such mapping may in particular be used to calibrate a device or a sensor of an on-board system, such as an advanced driver-assistance system, so as to compensate for the optical aberrations of said delineated region. This calibration may, for example, be based on particular digital processing of the data acquired by the device or sensor of an on-board system.

Therefore, one noteworthy effect of the invention is that it allows the optical quality of a delineated region of a glazing, and in particular of a windshield, to be measured under conditions that are very similar, if not identical, to those under which an optical device or sensor of an on-board system may operate.

One particular advantage of the invention according to its second aspect is that the optical quality of the delineated region is measured under conditions that are very similar, if not identical, to those under which an acquiring or measuring device of an on-board advanced system placed facing said region is used. In other words, the quality of the delineated region is measured such that it is likely to have an influence on the performance of said device.

In the context of the invention, by delineated region 1003 of the glazing 1000, what is meant is a region delineated by edges, in particular opaque edges, in particular edges formed by decorative elements allowing elements of devices, such as devices of on-board advanced systems, arranged behind the glazing, to be hidden from sight.

In the method according to the first aspect of the invention, the surface of said delineated region 1003 is in the depth of field of said optical digital acquiring device 3002. In other words, the surface of the delineated region is located in the focal region of the optical digital acquiring device 3002. Said device is focused using the surface of the delineated region. In particular, the optical digital acquiring device 3002 may be focused on the surface of said delineated region 1003.

The measurement, carried out in step (3) of the method according to the first aspect of the invention or in step (7) of the method according to the second aspect of the invention, of the phase shifts between the periodic patterns of multiple different phases and their corresponding images, which are acquired in steps (1) and (2), may be carried out in a conventional way by extracting the fundamental component of a Fourier series after Fourier transformation of the images, or even using a method based on summation of intensities such as the method described in P. Hariharan et al., Digital phase-shifting interferometry: a simple error-compensating phase calculation algorithm, Applied Optics, 26 (13), 1987. The phase shifts thus measured then allow the curvature gradients at each point in the area of the delineated region corresponding to the pixels of the optical digital acquiring device to be characterized.

In particular, the optical quality criterion computable using the method according to the invention may be chosen from the optical distortion or the optical power.

The optical distortion is due to a deviation, by refraction, of the rectilinear projection when the straight lines of a scene remain lines in the image of the scene observed through a glazing. It may be measured using the protocol described in Regulation No 43 of the Economic Commission for Europe of the United Nations (UN/ECE)—Uniform provisions concerning the approval of safety glazing materials and their installation on vehicles.

The optical power of a glazing represents the ability of said glazing to cause an electromagnetic wave such as light to converge or diverge. It is generally defined as the ratio between the angle of sight of the object through the glazing and the actual size of the object. When the object is placed at the focal point of the glazing, the optical power, called intrinsic optical power, may be expressed as the inverse of the focal length. Optical power is generally expressed in diopters.

The periodic patterns may be any suitable patterns of multiple different phases. Preferably, the periodic patterns may be periodic sets of rectilinear elements arranged in parallel with a given period, or phase. By way of example, the patterns may be alternations of light and dark lines regularly arranged in one direction, each pattern differing from the others in its different value of period, or phase. The set of patterns thus forms a plurality of patterns of multiple different phases.

Instead of being made up of lines, the periodic patterns may be sinusoidal periodic patterns. An example of a sinusoidal pattern is a succession of light and dark lines separated by intensity gradients. This type of pattern improves the precision of the measurements of the phase shift between the patterns and their corresponding images in steps (1) and (2) of the method according to the first aspect of the invention or in steps (5) and (6) of the method according to the second aspect of the invention.

The plurality of periodic patterns of multiple different phases of step (1) of the method according to the first aspect of the invention or of step (5) of the method according to the second aspect of the invention may, as regards their form, be identical to the plurality of step (2) of the method according to the first aspect of the invention or step (6) of the method according to the second aspect of the invention, each of the two pluralities differing from each other only in their spatial orientation. The plurality of periodic patterns of multiple different phases of step (2) of the method according to the first aspect of the invention or of step (6) of the method according to the second aspect of the invention is thus oriented in a first direction different from the second direction in which is oriented the plurality of periodic patterns of multiple different phases of step (1) of the method according to the first aspect of the invention or of step (5) of the method according to the second aspect of the invention. For example, the two pluralities of periodic patterns of multiple different phases may be two pluralities of sets of parallel lines that are oriented in two different directions, one for each plurality.

Preferably, in steps (1) and (2) of the method according to the first aspect of the invention or in steps (5) and (6) of the method according to the second aspect of the invention, the first direction and the second direction are orthogonal to each other. Orthogonality makes it possible to determine values of the gradients of the curvatures of the delineated region in the two orthogonal directions of a Cartesian coordinate system. The computation of the quality criterion may be facilitated thereby.

In the system 3000 shown in FIGS. 3 and 4, the pluralities of periodic patterns 3001, 4001 of multiple different phases may be obtained using a digital display device, such as a digital screen, programmed for this purpose.

Generally, the higher the number of periodic patterns acquired, the smaller the statistical errors associated with the measurement, i.e. the more accurate the measurement, will be. Thus, the number of periodic patterns of multiple different phases in each of steps (1) and (2) of the method according to the first aspect of the invention or in steps (5) and (6) of the method according to the second aspect of the invention may advantageously be at least four, preferably at least eight, or even at least twelve, each of the periodic patterns of multiple different phases of each of steps (1) and (2) of the method according to the first aspect of the invention or each of steps (5) and (6) of the method according to the second aspect of the invention having a different phase.

Depending on the decorative elements used to form the delineated region of the glazing, the area near the edges that they form may introduce severe optical distortions and disturb the measurement of the optical quality of the delineated region near said edges. For example, such a situation may arise when enamels having an unsuitable composition are used as decorative elements to form a delineated region on certain glasses. In this case, digital processing is carried out on all the optical-criterion values computed in step (4) of the method according to the first aspect of the invention or step (7) of the method according to the second aspect of the invention. This digital processing advantageously allows the noise caused by the severe distortions in the vicinity of the delineated region to be decreased. An example of a simple and advantageous type of digital processing is a Gaussian filter.

The angle of inclination between the median axis (C) of the surface of the delineated region 1003 and the optical axis (B) corresponds to the angle of inclination between the median axis (C) of the surface of the delineated region 1003 and an axis (A) that may correspond to the axis of the chassis of the vehicle in which said glazing 1000 is intended to be installed. In other words, the glazing is inclined with respect to the optical axis of the optical digital acquiring device 3002 by an angle corresponding to that at which said glazing is intended to be used. The angle of inclination between the median axis (C) of the surface of the delineated region 1003 and the axis (A) corresponds to the angle that the surface of the glazing 1000 and the chassis of the vehicle will form when said glazing is installed in the vehicle for its use. The axis (A) is generally horizontal.

Figure 2:
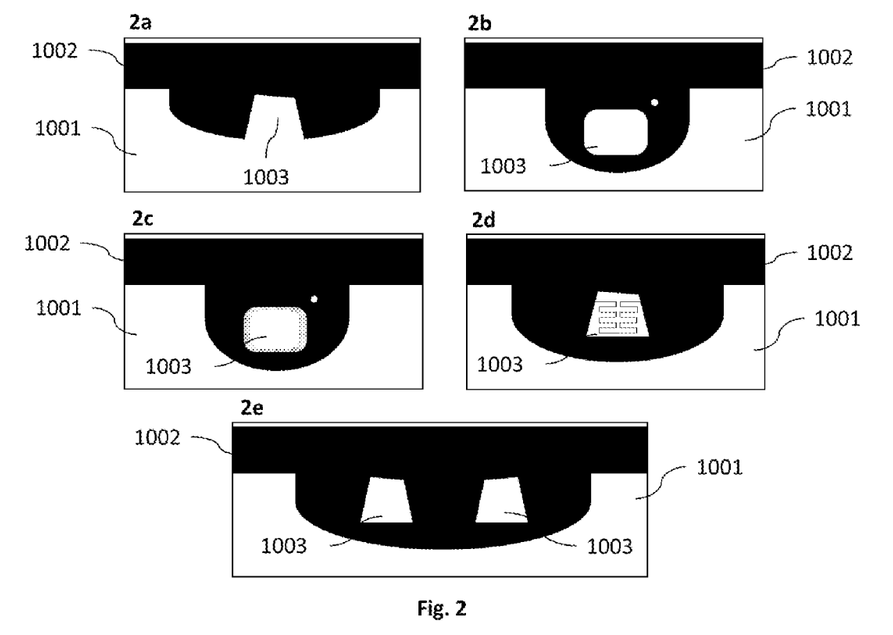
FIG. 2 groups together schematic representations of different forms of delineated region.

The delineated region 1003 may have various shapes and/or comprise additional functional elements depending on the use to be made thereof. Examples of delineated regions 1003 are shown in FIG. 2. FIG. 2a shows a trapezium-shaped delineated region 1003 with an open bottom edge. FIG. 2b shows a region delineated by two portions, one in the shape of a rectangle with rounded edges and the other, which is smaller, in the shape of a circle. The portion in the shape of a circle may, for example, serve for the installation of an additional device such as a rain sensor or outside-luminosity sensor. FIG. 2c is a variant of the region of FIG. 2b in which the portion in the shape of a rectangle with rounded edges further comprises a gradation strip on its outer periphery. FIG. 2d shows a delineated region the area of which contains a heating element, allowing any mist or frost liable to form on said surface and to hinder the acquisition of an optical device placed facing to be removed.

Generally, in the context of the invention, but nonlimitingly, the delineated region of the glazing is a region delineated by at least two edges, and preferably three edges.

The optical digital acquiring device may preferably be a high-resolution digital camera. The pixel size of the digital sensor of the camera may then be comprised between 20 μm and 2 μm, and preferably between 10 μm and 5 μm. Such a pixel size allows resolved images to be obtained in proximity to the edges of the delineated region. Thus, it is possible to accurately assess whether the size of the useful segment of the delineated region is sufficient for the one or more optical devices that will subsequently be placed facing the delineated region when the glazing is installed in a vehicle to operate correctly. In particular, the method according to the invention allows optical quality to be measured at less than 0.1 mm from the interior edges of the delineated region.

For the purposes of measuring optical quality using the method according to the invention, the distance between the periodic patterns and the optical digital device, and the distance between the delineated region of the glazing and the optical digital device, depend on the various system elements with which it is implemented. In particular, these distances may depend on the technical characteristics of the optical digital acquiring device 3002 and on the size of the periodic patterns 3001 and 4002.

The distance between the delineated region of the glazing and the optical digital acquiring device may be comprised between 2000 mm and 1500 mm.

In a particular embodiment of the method according to the aspect of the invention, the optical digital acquiring device is placed in a position corresponding to that of an acquiring or measuring device of an advanced on-board system. One advantage thereof is that the optical quality of the delineated region is measured under conditions that are very similar, if not identical, to those under which an acquiring or measuring device of an on-board advanced system placed facing said region is used. In other words, the quality of the delineated region is measured such that it is likely to have an influence on the performance of said device.

In certain embodiments of the method according to the first aspect of the invention, the distance between the periodic patterns and the optical digital device varies depending on the spatial resolution and precision sought for the value of the quality criterion. By way of example, it may be comprised between 3000 mm and 2000 mm.

In certain embodiments of the method according to the second aspect of the invention, with reference to FIGS. 5 to 8, the optical digital acquiring device 3002 may be positioned, in steps (1) and (3), using an automatic moving means 5001 such as an articulated robot arm. The automatic moving means may advantageously be programmable or controlled using any programmable means so that the optical digital acquiring device 3002 is positioned by virtue of a preliminary step of determining the, optionally approximate, location of the delineated region 1003 of the glazing 1001 on the basis of information on the shape of the glazing and of the characteristics of the edges of said delineated region.

The digital processing of step (3) of the method according to the second aspect of the invention may be of any suitable type, and especially by the use of various digital filters, in particular edge-detection filters, to emphasize the edges or outlines of the delineated region 1003 of the glazing 1000. Examples of filters are the Sobel filter and the Canny filter. These filters may be combined with thresholding methods. The digital processing may advantageously be automated using any programmable data-processing means.

The two aspects of the invention are particularly suitable for measuring the optical quality of a delineated region of a glazing, and in particular a windshield, of a land vehicle.

The invention claimed is:

1. A method for measuring an optical quality of a delineated region of a glazing, said method comprising the following steps:
   (1) positioning an optical digital acquiring device such that a surface of the glazing is in a depth of field of said optical digital acquiring device;
   (2) acquiring, using said optical digital acquiring device, at least one image of the surface of said glazing;
   (3) locating the delineated region of the glazing on the surface of the glazing using digital processing of the image acquired in step (2);
   (4) positioning the optical digital acquiring device facing the delineated region of the glazing in a position corresponding to that of an acquiring or measuring device of an advanced on-board system placed facing said region;
   (5) acquiring, through said delineated region of the glazing, images of a plurality of periodic patterns of multiple different phases, using the optical digital acquiring device, said patterns being oriented in a first direction in space;

(6) acquiring, through said delineated region, images of a plurality of periodic patterns of multiple different phases, using said optical digital acquiring device, said patterns being oriented in a second direction in space;

(7) measuring, for each of the points corresponding to the pixels of the optical digital acquiring device, phase shifts between the images of the patterns acquired in steps (5) and (6) and corresponding images of the periodic patterns of multiple different phases acquired in the absence of the glazing;

(8) computing, for each of the points corresponding to the pixels of the optical digital acquiring device, values of at least one optical quality criterion on the basis of all of the measurements of the phase shifts obtained in step (7).

2. The method as claimed in claim 1, wherein the first direction and the second direction are orthogonal to each other.

3. The method as claimed in claim 1, wherein the optical digital acquiring device is a digital camera with a pixel size comprised between 20 µm and 2 µm.

4. The method as claimed in claim 3, wherein the pixel size is comprised between 10 µm and 5 µm.

5. The method as claimed in claim 1, wherein a number of periodic patterns of multiple different phases in each of steps (5) and (6) is at least four, each of sinusoidal patterns of multiple different phases of each of steps (5) and (6) having a different phase.

6. The method as claimed in claim 5, wherein the number of periodic patterns of multiple different phases in each of steps (5) and (6) is at least eight.

7. The method as claimed in claim 6, wherein the number of periodic patterns of multiple different phases in each of steps (5) and (6) is at least twelve.

8. The method as claimed in claim 1, wherein the optical quality criterion is chosen from the optical distortion or the optical power.

9. The method as claimed in claim 1, wherein the glazing is inclined with respect to an optical axis of the optical digital acquiring device by an angle corresponding to that at which said glazing is intended to be used.

10. The method as claimed in claim 1, wherein the glazing is a vehicle windshield.

11. The method as claimed in claim 1, wherein the delineated region of the glazing is delineated by at least three edges.

12. The method as claimed in claim 1, wherein the periodic patterns are sinusoidal patterns.

13. The method as claimed in claim 1, wherein digital processing is carried out on all of the values of the at least one optical criterion.

14. The method as claimed in claim 13, wherein the digital processing is a Gaussian filter.

* * * * *